United States Patent
Chen et al.

(10) Patent No.: US 8,659,822 B2
(45) Date of Patent: Feb. 25, 2014

(54) MULTILAYERED INFRARED LIGHT REFLECTIVE STRUCTURE

(75) Inventors: Hsiang-Chuan Chen, Taoyuan County (TW); Mei-Ching Chiang, Taipei County (TW); Chin-Ching Lin, Taichung (TW); Jen-You Chu, Changhua County (TW); Yi-Ping Chen, Kaohsiung County (TW); Pao-Tang Chung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 386 days.

(21) Appl. No.: 12/976,897

(22) Filed: Dec. 22, 2010

(65) Prior Publication Data

US 2012/0113505 A1  May 10, 2012

(30) Foreign Application Priority Data

Nov. 8, 2010  (TW) ................................ 99138292 A

(51) Int. Cl.
  *G02B 5/08* (2006.01)
  *G02B 5/20* (2006.01)
  *G02B 1/11* (2006.01)
(52) U.S. Cl.
  CPC .............. *G02B 5/208* (2013.01); *G02B 1/115* (2013.01)
  USPC ........................................ 359/359; 359/584
(58) Field of Classification Search
  USPC .......... 359/584, 350, 359–360, 614, 887, 890
  See application file for complete search history.

(56) References Cited

U.S. PATENT DOCUMENTS

| | | | |
|---|---|---|---|
| 4,581,280 A | 4/1986 | Taguchi et al. | |
| 5,183,700 A * | 2/1993 | Austin | 359/359 |
| 5,667,880 A | 9/1997 | Okaniwa | |
| 6,552,329 B2 | 4/2003 | Haas et al. | |
| 6,844,976 B1 | 1/2005 | Firon et al. | |
| 6,906,863 B2 * | 6/2005 | Yoshida et al. | 359/584 |
| 6,947,217 B2 | 9/2005 | Corzine et al. | |
| 7,236,296 B2 | 6/2007 | Liu et al. | |
| 7,539,229 B2 | 5/2009 | Kim et al. | |
| 7,590,159 B2 | 9/2009 | Jikutani et al. | |
| 7,652,736 B2 | 1/2010 | Padiyath et al. | |
| 2006/0215720 A1 | 9/2006 | Corzine et al. | |
| 2006/0226777 A1 | 10/2006 | Cunningham | |

(Continued)

FOREIGN PATENT DOCUMENTS

| | | |
|---|---|---|
| CN | 101153928 | 4/2008 |
| CN | 101603619 | 12/2009 |

(Continued)

OTHER PUBLICATIONS

EPO, Extend Search Report, Application No. 10196789.1, May 7, 2012, Europe.

(Continued)

*Primary Examiner* — Stephone B Allen
*Assistant Examiner* — Jeffrey Madonna

(57) ABSTRACT

The invention provides a multilayered infrared light reflective structure. The multilayered infrared light reflective structure includes a transparent substrate. A doped oxide film is disposed on the transparent substrate. An oxide isolated layer is disposed on the doped oxide film, thereby allowing incident light to be incident from a top surface of the transparent substrate into the multilayered infrared light reflective structure.

7 Claims, 18 Drawing Sheets

(56) References Cited

U.S. PATENT DOCUMENTS

| | | |
|---|---|---|
| 2007/0009747 A1 | 1/2007 | Medwick et al. |
| 2008/0075936 A1 | 3/2008 | McGurran et al. |
| 2008/0176973 A1 | 7/2008 | Qiu et al. |
| 2008/0292820 A1 | 11/2008 | Padiyath et al. |
| 2009/0075067 A1 | 3/2009 | Myli et al. |
| 2009/0116113 A1* | 5/2009 | Wei et al. ............... 359/359 |
| 2009/0233037 A1 | 9/2009 | Medwick et al. |
| 2009/0233106 A1 | 9/2009 | Medwick et al. |
| 2009/0320894 A1 | 12/2009 | Angiuli et al. |
| 2010/0220388 A1* | 9/2010 | Suzuki et al. ............ 359/359 |

FOREIGN PATENT DOCUMENTS

| | | |
|---|---|---|
| DE | 102007011865 A1 | 9/2008 |
| WO | WO 00/27771 | 5/2000 |
| WO | WO 00/37384 | 6/2000 |

OTHER PUBLICATIONS

China Patent Office, Office Action, Patent Application Serial No. 201010563204.8, Mar. 20, 2013, China.

* cited by examiner

MULTILAYERED INFRARED LIGHT REFLECTIVE STRUCTURE

CROSS REFERENCE TO RELATED APPLICATIONS

This Application claims priority of Taiwan Patent Application No. 099138292, filed on Nov. 8, 2010, the entirety of which is incorporated by reference herein.

BACKGROUND OF THE INVENTION

1. Field of the Invention

The present invention relates to a multilayered infrared light reflective structure, and in particular, to a multilayered infrared light reflective structure with low cost and high reflection.

2. Description of the Related Art

In recent years, due to energy saving concerns for buildings, development for building materials which save energy have increased. It has been reported, for a building, approximately 30%-40% of air conditioning usage can be reduced through energy saving apparatuses on buildings. Currently, low-emissivity glass, which is one type of energy saving apparatus, is fabricated using vacuum sputtering equipment and processes. The low-emissivity glass is constructed by a metallic film and a transparent oxide film, wherein a main material of the metallic film comprises Ag, which highly reflects infrared light. Meanwhile, the transparent oxide film mainly comprises $SnO_2$, which also highly reflects infrared light while enhancing transmittance. Note that low-emissivity glass may also combine other protective films or hallow films therewith to achieve even higher reflection. The low-emissivity glass, however, is costly, because commonly, over 10 films are required to be fabricated and vacuum sputtering equipment and processes are expensive. Also, the fabrication of low-emissivity glass is complex and difficult. Additionally, an electro plating method is used to form the metallic film, which results in high contamination. Accordingly, the low-emissivity glass can not be recycled as standard clear glass, thereby making the low-emissivity glass non-environmentally friendly.

Thus, a novel multilayered infrared light reflective structure is desired to solve the aforementioned problems.

BRIEF SUMMARY OF INVENTION

A multilayered infrared light reflective structure is provided. An exemplary embodiment of a multilayered infrared light reflective structure comprises a transparent substrate. A doped oxide film is disposed on the transparent substrate. An oxide isolated layer is disposed on the doped oxide film, thereby allowing incident light to be incident from a top surface of the transparent substrate into the multilayered infrared light reflective structure.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
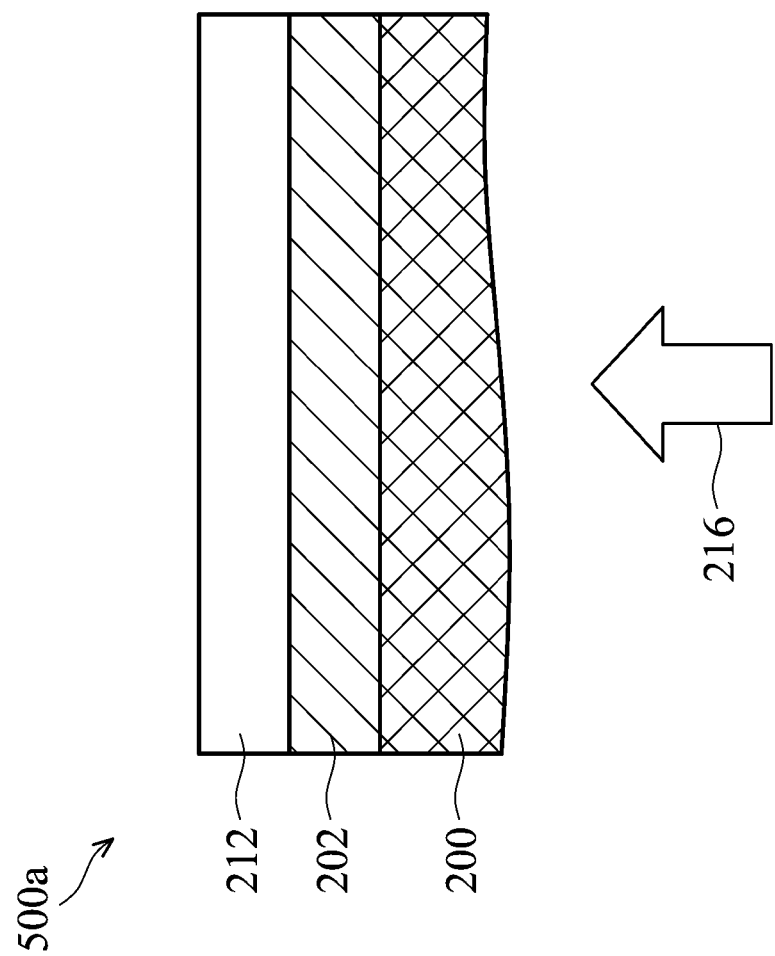
FIG. 1 is a schematic view of one exemplary embodiment of a multilayered infrared light reflective structure of the invention.

The following description is of a mode for carrying out the invention. This description is made for the purpose of illustrating the general principles of the invention and should not be taken in a limiting sense. The scope of the invention is best determined by reference to the appended claims. Wherever possible, the same reference numbers are used in the drawings and the descriptions to refer the same or like parts.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice of the invention.

One exemplary embodiment of a multilayered infrared light reflective structure is provided. The multilayered infrared light reflective structure uses a heavily doped oxide film as an energy saving glass building material having both good transmittance for a visible light (i.e. a light with wavelengths between 700 nm and 2500 nm) and good reflection for near infrared light. The multilayered infrared light reflective structure may allow an incident light to be incident from a top surface of a transparent substrate into the heavily doped oxide film in the multilayered infrared light reflective structure. High reflection efficiency can be achieved due to the high dopant concentration of the heavily doped oxide film.

FIG. 1 is a schematic view of one exemplary embodiment of a multilayered infrared light reflective structure 500a of the invention. The multilayered infrared light reflective structure 500a may comprise a transparent substrate 200. A doped oxide film 202 is disposed on the transparent substrate 200. An oxide isolated layer 212 is disposed on the doped oxide film 202, thereby allowing incident light 216 to be incident from a top surface of the transparent substrate 200 into the multilayered infrared light reflective structure. In one embodiment, the transparent substrate 200 may comprise a glass substrate, a polymer film substrate, or an organic-inorganic hybrid substrate.

In one embodiment, the doped oxide film 202 may be deposited on the transparent substrate 200 by a chemical spraying or atmospheric chemosynthesis method. In one embodiment, when the doped oxide film 202 is formed by the chemical spraying method, a mixed gas of, for example, a carrier gas comprising air, oxygen, nitrogen and a reactive gas comprising $Sn(OH)_4$, $NH_4F$, LiF or Li(OH) can produced spray droplets with a diameter between about 5 μm and 80 μm on the heated transparent substrate 200 by using an atomizer with a resonance frequency between about 1.5 KHz and 2.6 MHz or a precision spray nozzle with a diameter of about 10 nm under a temperature of between about 360° C. and 460° C., to form the doped oxide film 202. In one embodiment, the doped oxide film 202 may comprise a doped tin oxide ($SnO_2$) film, for example, a lithium and fluorine co-doped tin oxide (Li—F:$SnO_2$) film, an aluminum-doped zinc oxide (Al:$ZnO_2$) film, a tin-doped indium oxide (Sn:$In_2O_3$) film or a gallium-doped zinc oxide (Ga:$ZnO_2$) film. In one embodiment, the doped oxide film 202 is a Li—F:$SnO_2$ film, a dopant concentration of lithium (Li) in the Li—F:$SnO_2$ film is between about 0.3 at % and 4.2 at %, and a dopant concentration of fluorine (F) in the Li—F:$SnO_2$ film is between about 0.1 at % and 2.5 at %. The doped oxide film 202 is used as a first infrared light reflective film 202, wherein the doped oxide film 202 reflecting light with wavelengths between about 1500 nm and 2500 nm may have a thickness which is smaller than about 2 μm.

In one embodiment, the oxide isolated layer 212 may comprise a tungsten oxide ($WO_{3-x}$) layer with a thickness of between about 100 nm and 5000 nm, or preferably of between about 2000 nm and 3000 nm. The oxide isolated layer 212 may be used to reflect light of wavelengths of an infrared light wavelength region (for example, the $WO_{3-x}$ layer reflects light of wavelengths between about 800 nm and 1450 nm) which can not be reflected by the doped oxide film 202, so that infrared light reflection is improved for the multilayered infrared light reflective structure 500a.

Figure 2:
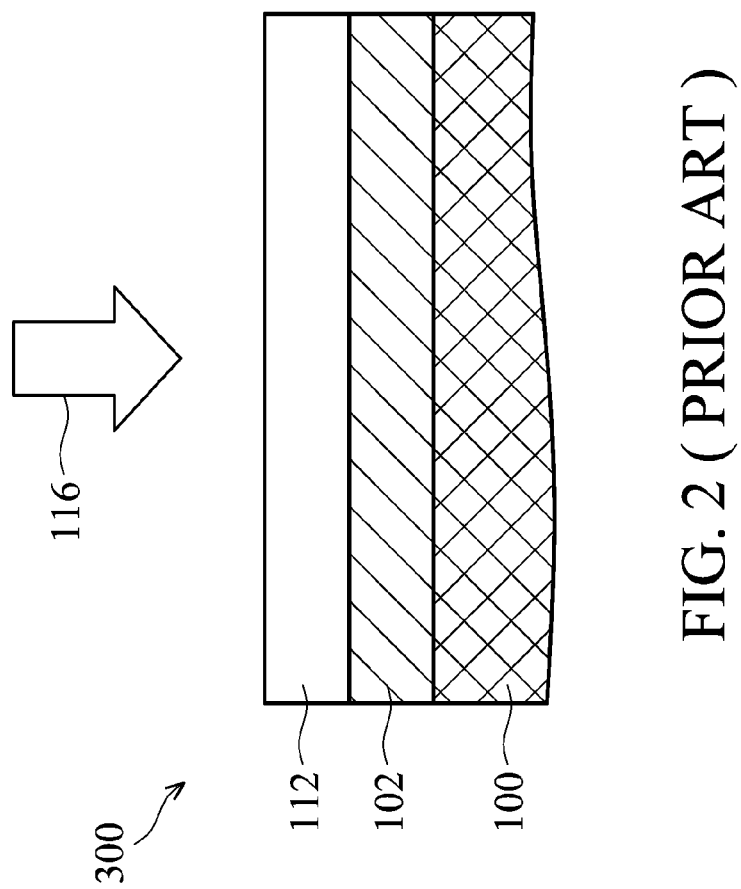
FIG. 2 is a schematic view of a conventional multilayered infrared light reflective structure.

FIG. 2 is a schematic view of a conventional multilayered infrared light reflective structure 300 serving as a comparative embodiment. The conventional multilayered infrared light reflective structure 300 comprises a doped oxide film 102 and an oxide isolated layer 112 sequentially disposed on a transparent substrate 100. A difference between the conventional multilayered infrared light reflective structure 300 and one exemplary embodiment of a multilayered infrared light reflective structure 500a is that an incident light 116 is incident from a top surface of the oxide isolated layer 112 into the conventional multilayered infrared light reflective structure 300.

Figure 3:
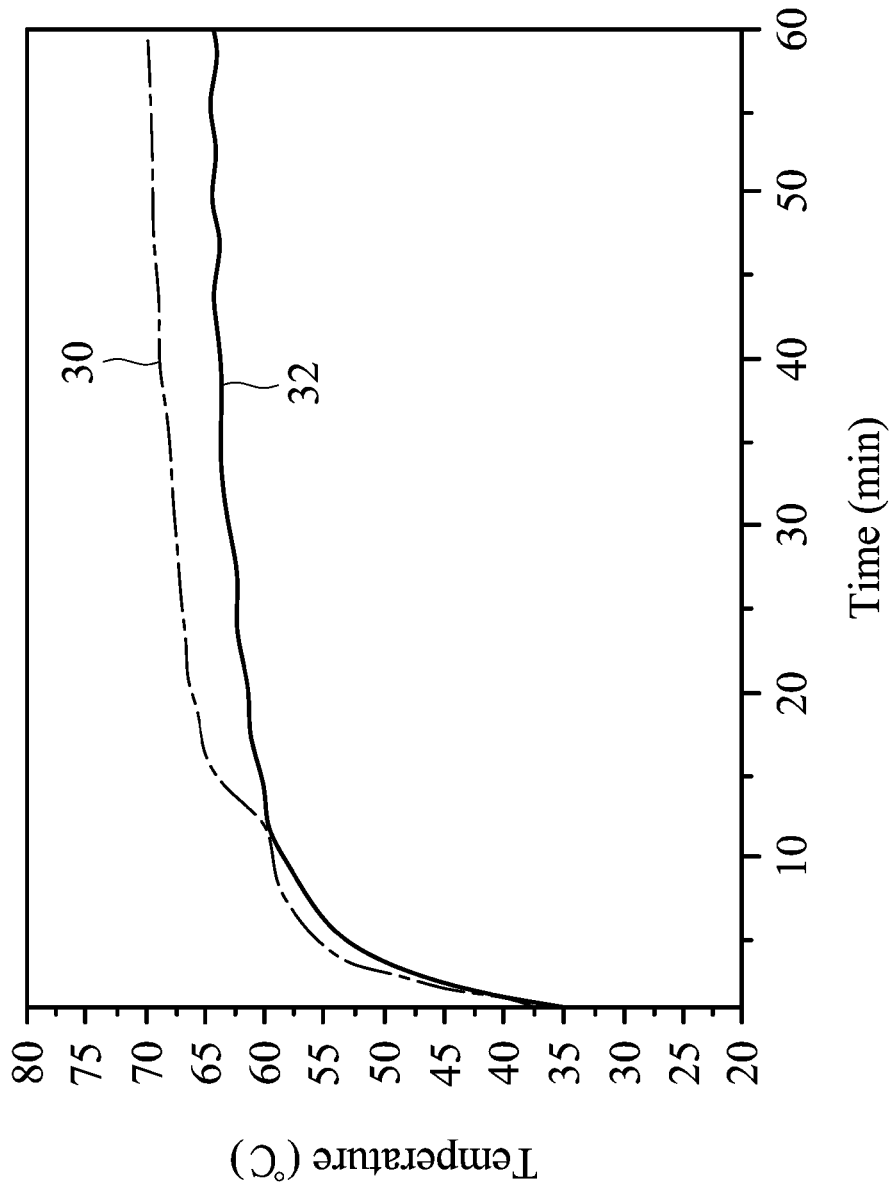
FIG. 3 illustrates temperature versus time curves of one exemplary embodiment of a multilayered infrared light reflective structure of the invention and the conventional multilayered infrared light reflective structure.

FIG. 3 illustrates temperature versus time curves of the doped oxide film (infrared light reflective film) 202 of the multilayered infrared light reflective structure 500a and the doped oxide film (infrared light reflective film) 102 of the conventional multilayered infrared light reflective structure 300. In FIG. 3, the curve 30 illustrates temperature versus time of the doped oxide film (infrared light reflective film) 102 of the conventional multilayered infrared light reflective structure 300, and the curve 32 illustrates temperature versus time of the doped oxide film (infrared light reflective film) 202 of the multilayered infrared light reflective structure 500a. As shown in FIG. 3, when the multilayered infrared light reflective structure 500a and the conventional multilayered infrared light reflective structure 300 are illuminated by light, temperature of the doped oxide film (infrared light reflective film) 202 of the multilayered infrared light reflective structure 500a is lower than that of the doped oxide film (infrared light reflective film) 102 of the conventional multilayered infrared light reflective structure 300. A temperature difference between the doped oxide film (infrared light reflective film) 202 of the multilayered infrared light reflective structure 500a and the doped oxide film (infrared light reflective film) 102 of the conventional multilayered infrared light reflective structure 300 can be up to about 5° C.; especially after being illuminated for a period of time (after about 15 min). Thus, the multilayered infrared light reflective structure 500a shows excellent reflection of heat.

Figure 4:
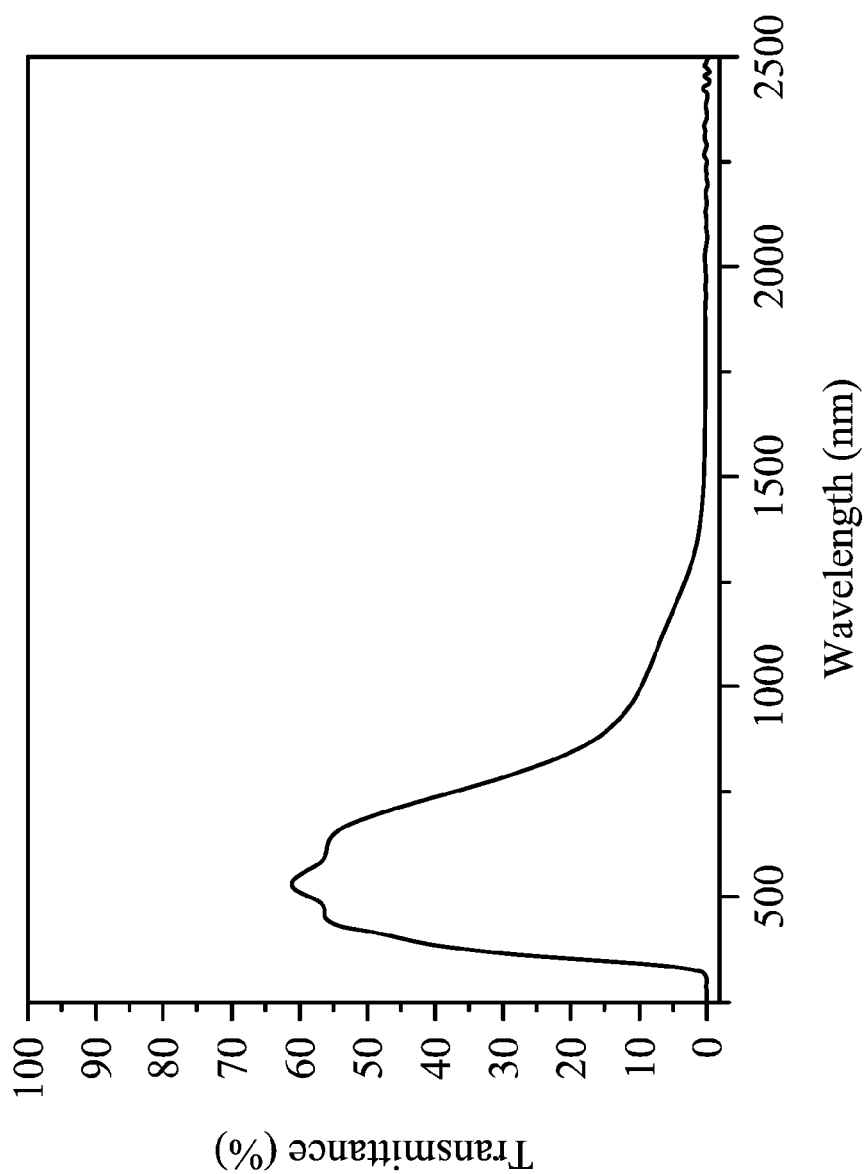
FIG. 4 illustrates a relationship between the wavelength and the transmittance of one exemplary embodiment of a multilayered infrared light reflective structure of the invention.
Figure 5:
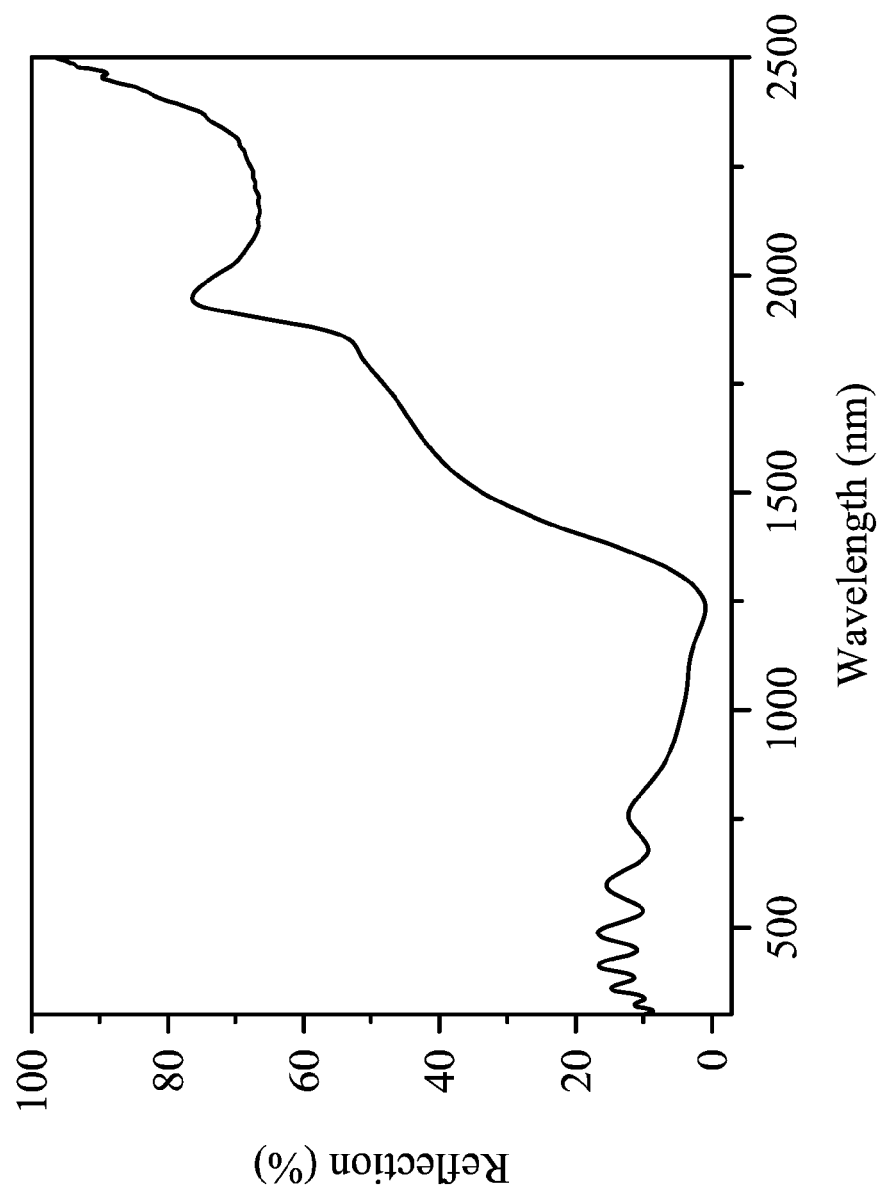
FIG. 5 illustrates a relationship between the wavelength and the reflection of one exemplary embodiment of a multilayered infrared light reflective structure of the invention.

FIG. 4 illustrates a relationship between the wavelength and the transmittance (%) of one exemplary embodiment of a multilayered infrared light reflective structure 500a of the invention. FIG. 5 illustrates a relationship between the wavelength and the reflection (%) of one exemplary embodiment of a multilayered infrared light reflective structure 500a of the invention. In this embodiment, the doped oxide film 202 of the multilayered infrared light reflective structure 500a is a lithium and fluorine co-doped tin oxide (Li—F:$SnO_2$) film with a thickness of about 300 nm, and the oxide isolated layer 212 is a tungsten oxide ($WO_{3-x}$) layer with a thickness of about 3000 nm. In this embodiment, the total number of films of the multilayered infrared light reflective structure 500a is two, As shown in FIGS. 4 and 5, it is observed that the multilayered infrared light reflective structure 500a allowed an incident light 216 to be incident from a top surface of the transparent substrate 200 into the doped oxide film 202 and the oxide isolated layer 212 in sequence, so that the multilayered infrared light reflective structure 500a may have a reflective effect of about 80% for light with wavelengths larger than about 800 nm. Additionally, the doped oxide film 202 formed of a lithium and fluorine co-doped tin oxide (Li—F:$SnO_2$) film may reflect infrared light of wavelengths between about 1500 nm and 10 μm. Further, the oxide isolated layer 212 formed of a tungsten oxide ($WO_{3-x}$) layer may reflect infrared light of wavelengths between about 800 nm and 1450 nm. Therefore, the multilayered infrared light reflective structure 500a may effectively reflect infrared light. Also, as shown in FIG. 4, it is observed that the transmittance of one exemplary embodiment of the multilayered infrared light reflective structure 500a for visible light (wavelength between about 400 nm and 700 nm) is larger than about 60%.

In summary, one exemplary embodiment of a multilayered infrared light reflective structure 500a has transmittance for visible light (wavelength between about 400 nm and 700 nm) of larger than about 60%, and reflects most of the near infrared light. Additionally, one exemplary embodiment of a multilayered infrared light reflective structure 500a shows excellent reflection of heat. In particular, when the multilayered infrared light reflective structure 500a is illuminated after about 20 min, a temperature of the multilayered infrared light reflective structure 500a is lower than that of the conventional multilayered infrared light reflective structure 300 by at least about 5° C.

Another exemplary embodiment of a multilayered infrared light reflective structure is also provided, which utilizes a heavily doped oxide film, for example, a lithium and fluorine co-doped tin oxide (Li—F:$SnO_2$, also referred to as Li—FTO) film, as a first infrared light reflection layer. High reflection efficiency can be achieved due to a high dopant concentration of the heavily doped oxide film. Further, a $SiO_2$/$TiO_2$ laminating film is deposited on the heavily doped oxide film. The $SiO_2$/$TiO_2$ reflective laminating film utilizes a distributed Bragg reflector (DBR) principle to achieve a high reflection for light with a specific wavelength region, so that the $SiO_2$/$TiO_2$ reflective laminating film may widen the reflection wavelength limit of the heavily doped oxide film for infrared light. Another exemplary embodiment of a multilayered infrared light reflective structure may combine characteristics of the two materials (the heavily doped oxide film and the $SiO_2$/$TiO_2$ reflective laminating film) to form a high efficiency multilayered infrared light reflective structure, and the multilayered infrared light reflective structure may improve the utility of energy saving glass building materials.

Figure 6:
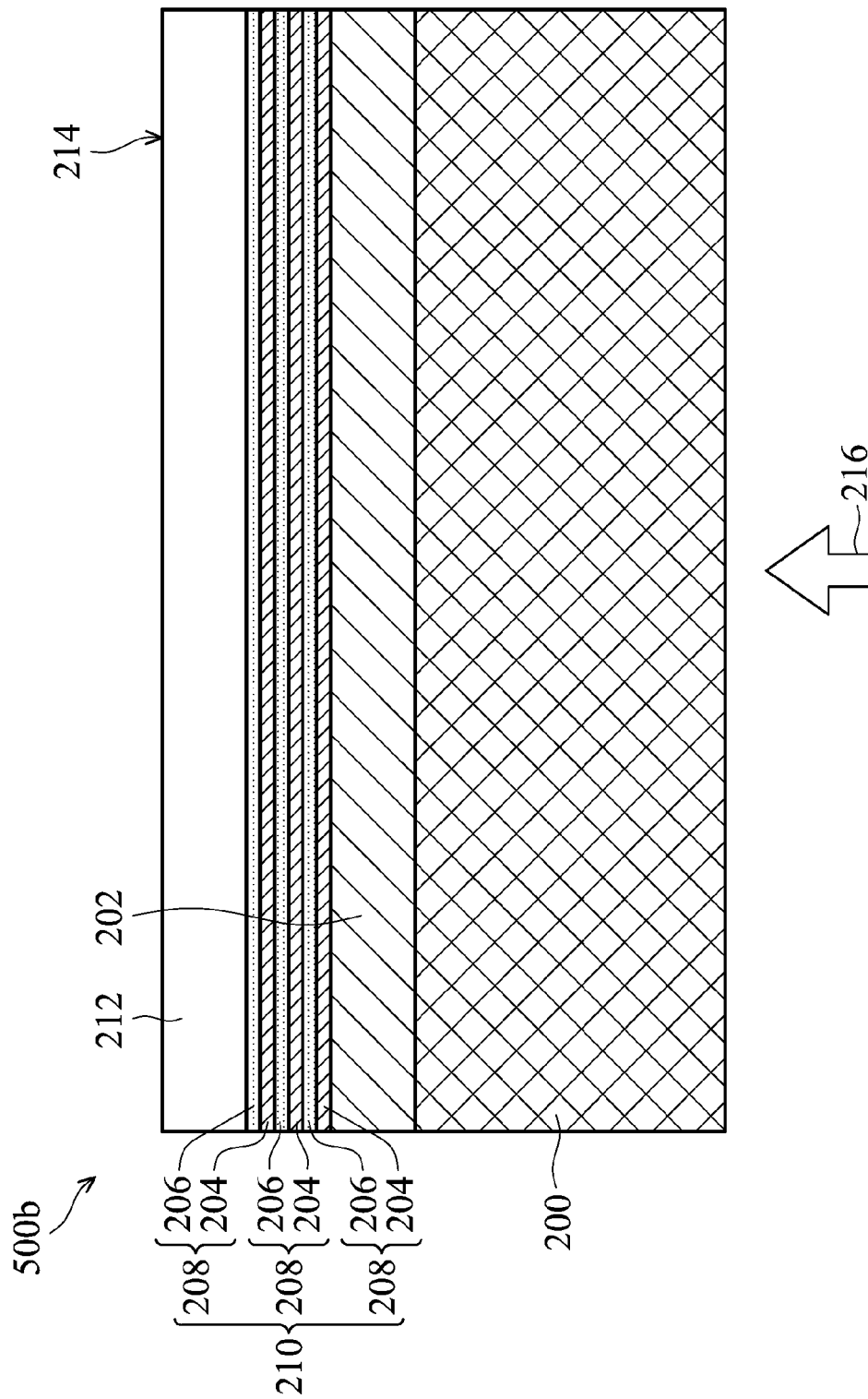
FIG. 6 is a schematic view of another exemplary embodiment of a multilayered infrared light reflective structure of the invention.

FIG. 6 is a schematic view of another exemplary embodiment of a multilayered infrared light reflective structure 500b of the invention. As shown in FIG. 6, the multilayered infrared light reflective structure 500b may comprise a transparent substrate 200. A doped oxide film 202 is disposed on the transparent substrate 200. An oxide isolated layer 212 is disposed on the doped oxide film 202. An oxide distributed Bragg reflector (DBR) film 210 is disposed on the oxide isolated layer 212, thereby allowing incident light 216 to be incident from a top surface of the transparent substrate 200 into the multilayered infrared light reflective structure 500b. In one embodiment, the transparent substrate 200 may comprise a glass substrate, a polymer film substrate, or an organic-inorganic hybrid substrate. In one embodiment, the doped oxide film 202 may be deposited on the transparent substrate 200 by a chemical spraying or atmospheric chemosynthesis method. In one embodiment, when the doped oxide film 202 is formed by the chemical spraying method, an atomizer with a resonance frequency between about 1.5 KHz and 2.6 MHz or a precision spray nozzle with a diameter of about 10 nm may produce droplets of a mixed gas of, for example, a carrier gas comprising air, oxygen, nitrogen and a reactive gas comprising Sn$(OH)_4$, $NH_4F$, LiF or Li(OH), with a diameter between about 5 μm and 80 μm on the heated transparent substrate 200 by using under a temperature of between about 360° C. and 460° C., to form the doped oxide film 202. In one embodiment, the doped oxide film 202 may comprise a doped tin oxide film, for example, a lithium and fluorine co-doped tin oxide (Li—F:$SnO_2$) film, an aluminum-doped zinc oxide (Al:$ZnO_2$) film, a tin-doped indium oxide (Sn:$In_2O_3$) film or a gallium-doped zinc oxide (Ga:$ZnO_2$) film. In one embodiment, the doped oxide film 202 is a Li—F:$SnO_2$ film, a dopant concentration of lithium (Li) in the Li—F:$SnO_2$ film is between about 0.3 at % and 4.2 at %, and a dopant concentration of fluorine (F) in the Li—F:$SnO_2$ film is between about 0.1 at % and 2.5 at %. The doped oxide film 202 is used as a first infrared light reflective film 202, wherein the doped oxide film 202 reflecting light with wavelengths between about 1500 nm and 2500 nm may have a thickness which is smaller than about 2 μm.

In one embodiment, the oxide distributed Bragg reflector (DBR) film 210 may be formed by a chemical sol-gel chemosynthesis method and a wet chemical deposition method, for example, a chemical spraying method, so that the oxide distributed Bragg reflector (DBR) film 210 serves as a second infrared light reflection film, wherein a working temperature of the chemical spraying method may be between about 100° C. and 350° C. Alternatively, the oxide distributed Bragg reflector (DBR) film 210 may be formed by a wet chemical deposition method such as a spin coating or a dip-coating method. The wet chemical deposition method used to form the oxide distributed Bragg reflector (DBR) film 210 can effectively control thicknesses of respective films in the oxide distributed Bragg reflector (DBR) film 210, so that the respective films may have uniform distribution. As shown in FIG. 6, the oxide distributed Bragg reflector (DBR) film 210 may comprise a plurality of pairs 208 of oxide films laminated vertically and continuously. For example, the oxide distributed Bragg reflector (DBR) film 210 may comprise at least two pairs of oxide films, or preferably two to ten pairs of oxide films. Each of the pairs 208 of oxide films comprises a lower $TiO_2$ film 204 and an upper $SiO_2$ film 206. For each of the pairs 208 of oxide films, the refractive index (n) of the lower $TiO_2$ film 204 is between about 1.9 and 2.7, and a thickness of the lower $TiO_2$ film 204 is between about 50 nm and 250 nm. Additionally, the refractive index (n) of the upper $SiO_2$ film 206 is between about 1.4 and 1.5, and a thickness of the upper $SiO_2$ film 206 is between about 50 nm and 250 nm.

Figure 10:
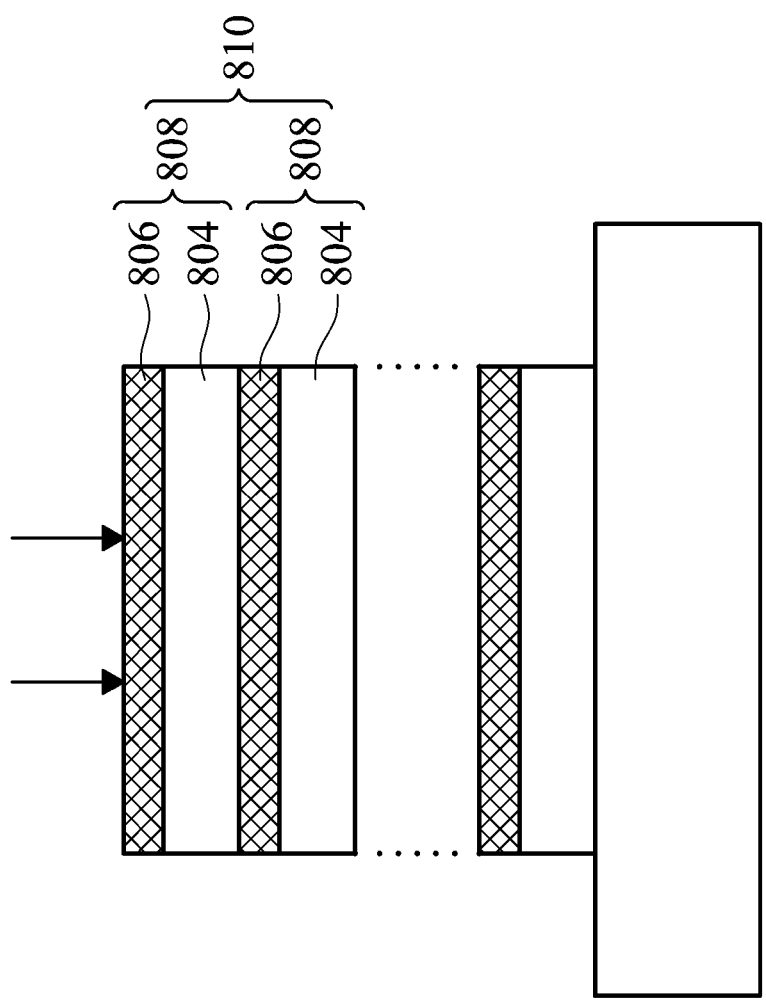
FIG. 10 is a schematic view of a distributed Bragg reflector (DBR).
Figure 11A:
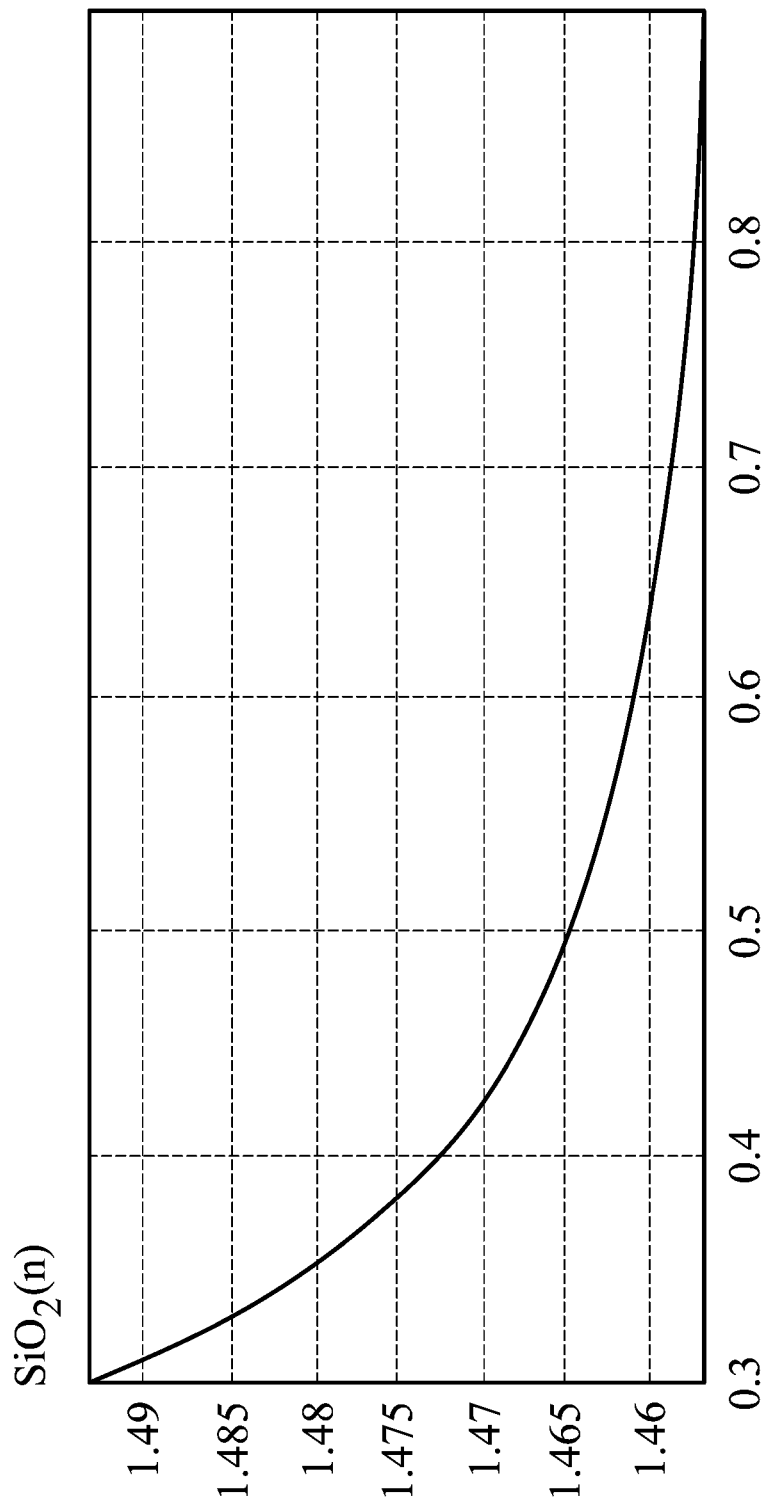
FIGS. 11a and 11b are measurement results of the reflective index (n) and the extinction coefficient (k) of a $SiO_2$ film of one exemplary embodiment of an oxide distributed Bragg reflector (DBR) film.
Figure 11B:
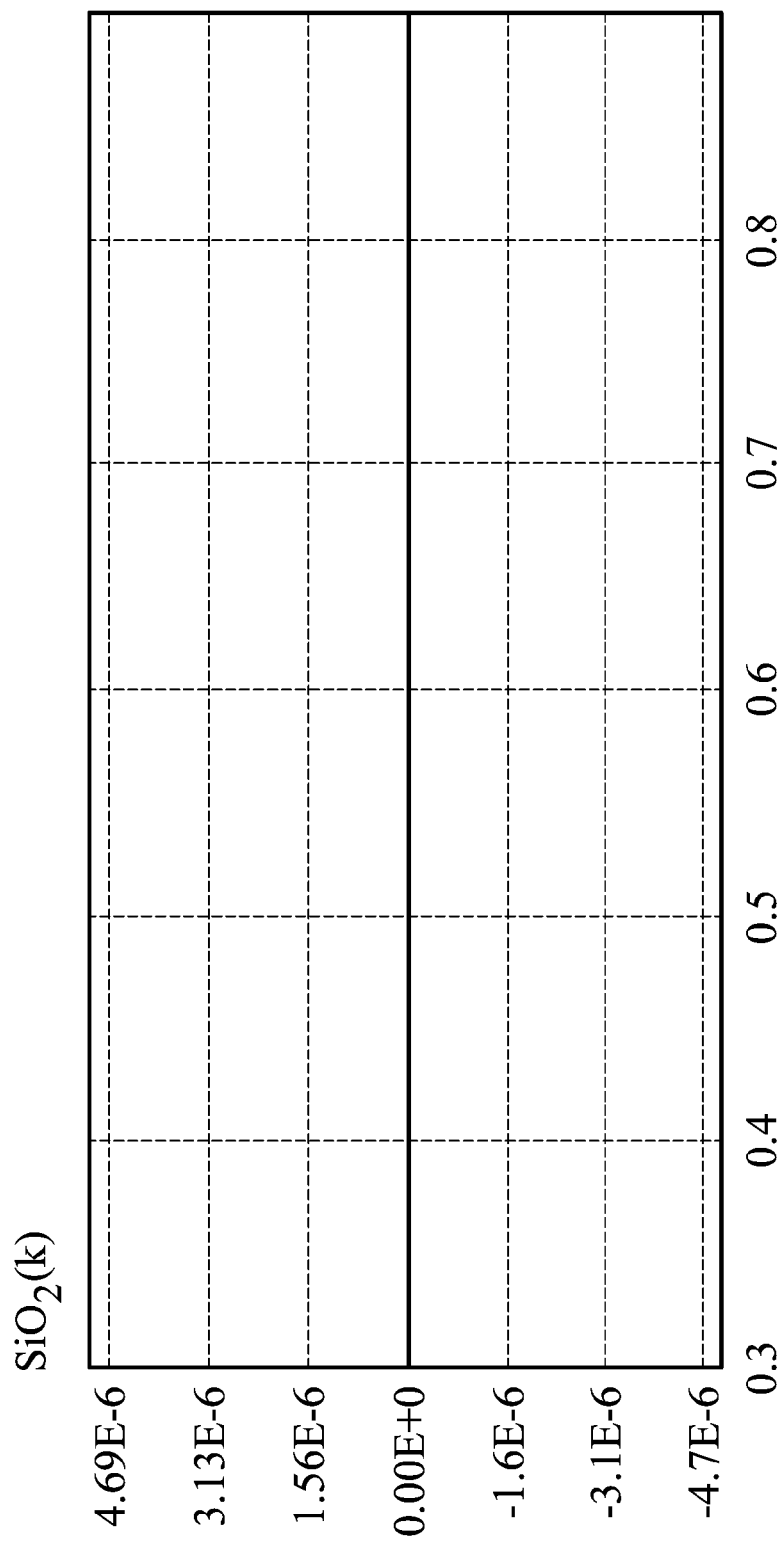
Figure 11C:
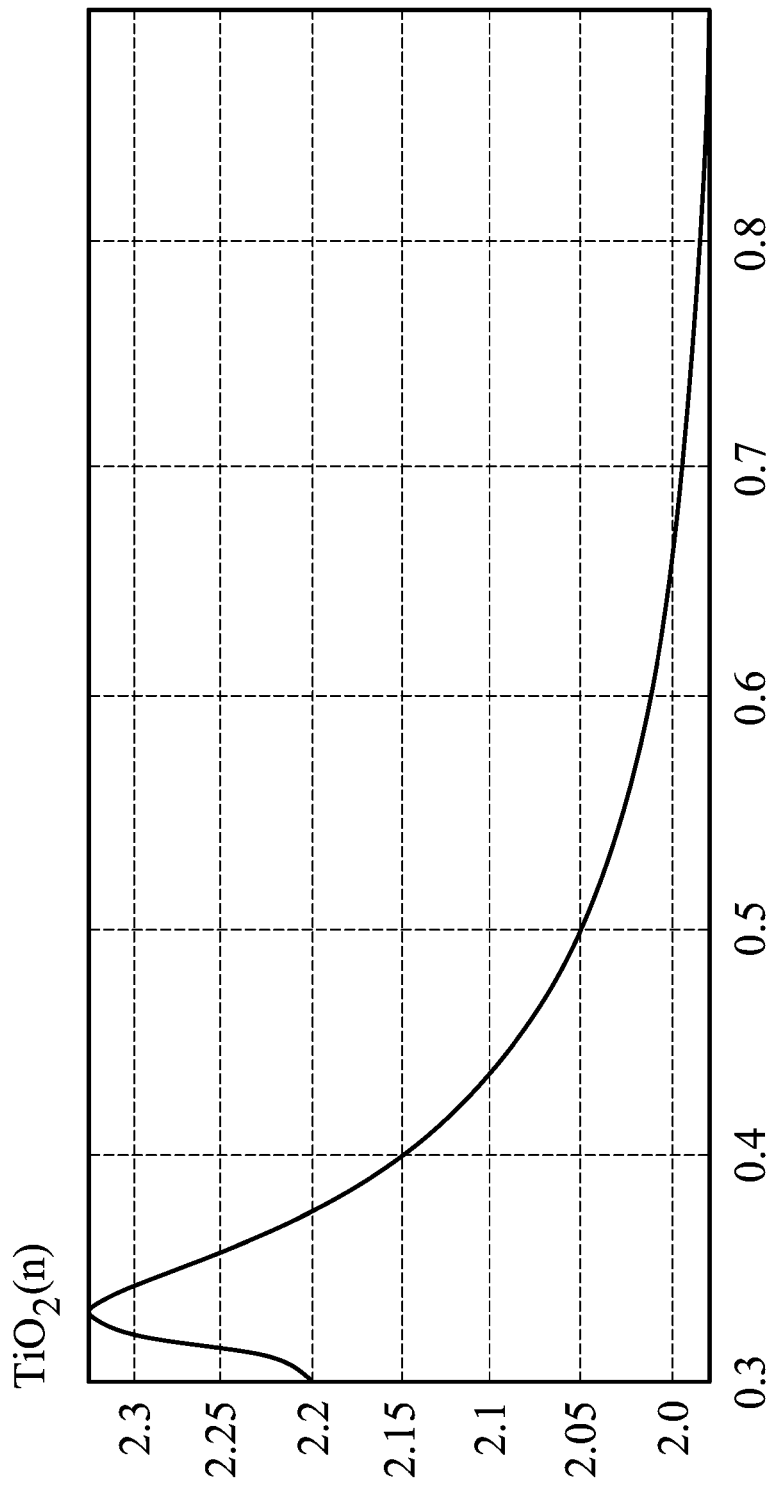
FIGS. 11c and 11d are measurement results showing the reflective index (n) and the extinction coefficient (k) of a $TiO_2$ film of one exemplary embodiment of an oxide distributed Bragg reflector (DBR) film.
Figure 11D:
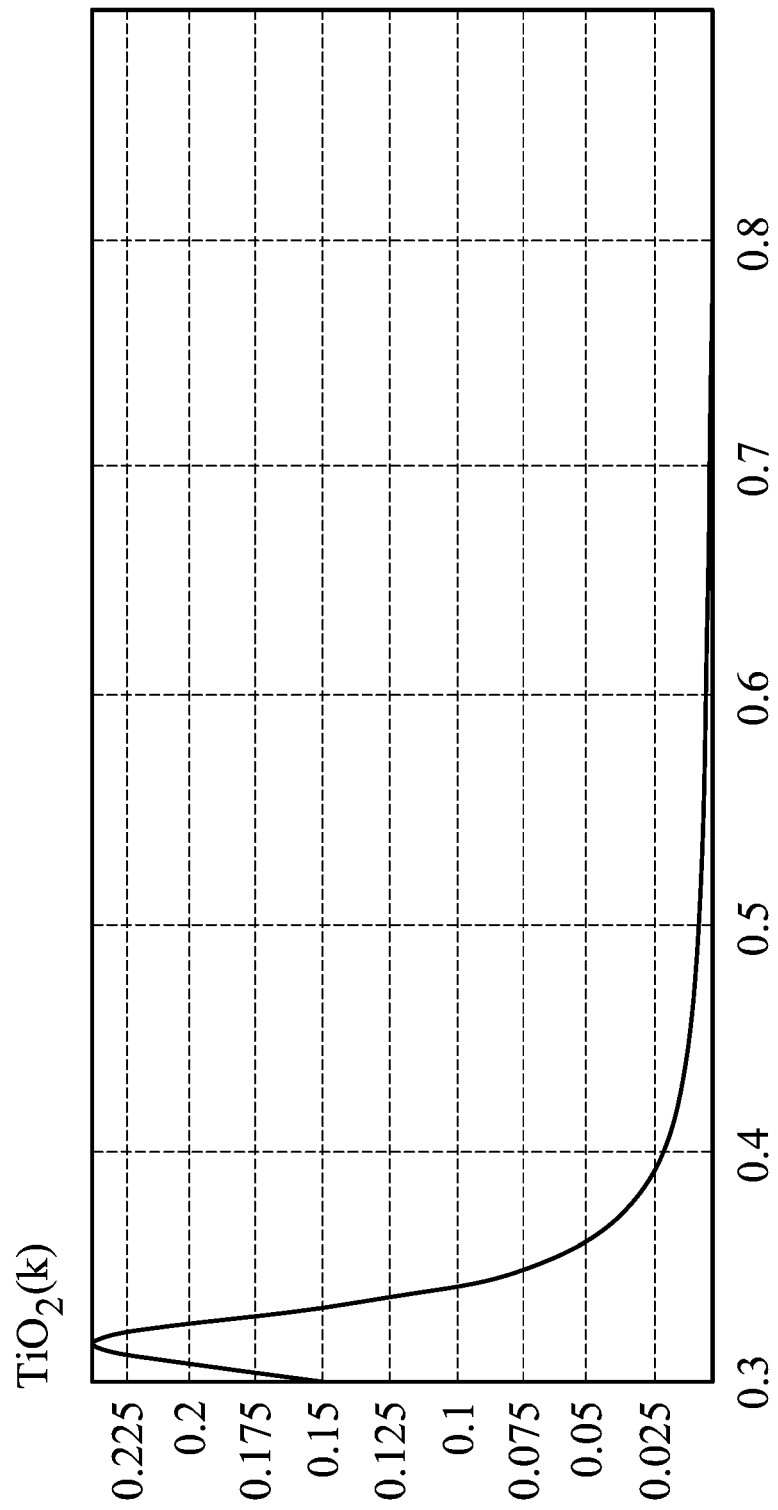
Figure 12A:
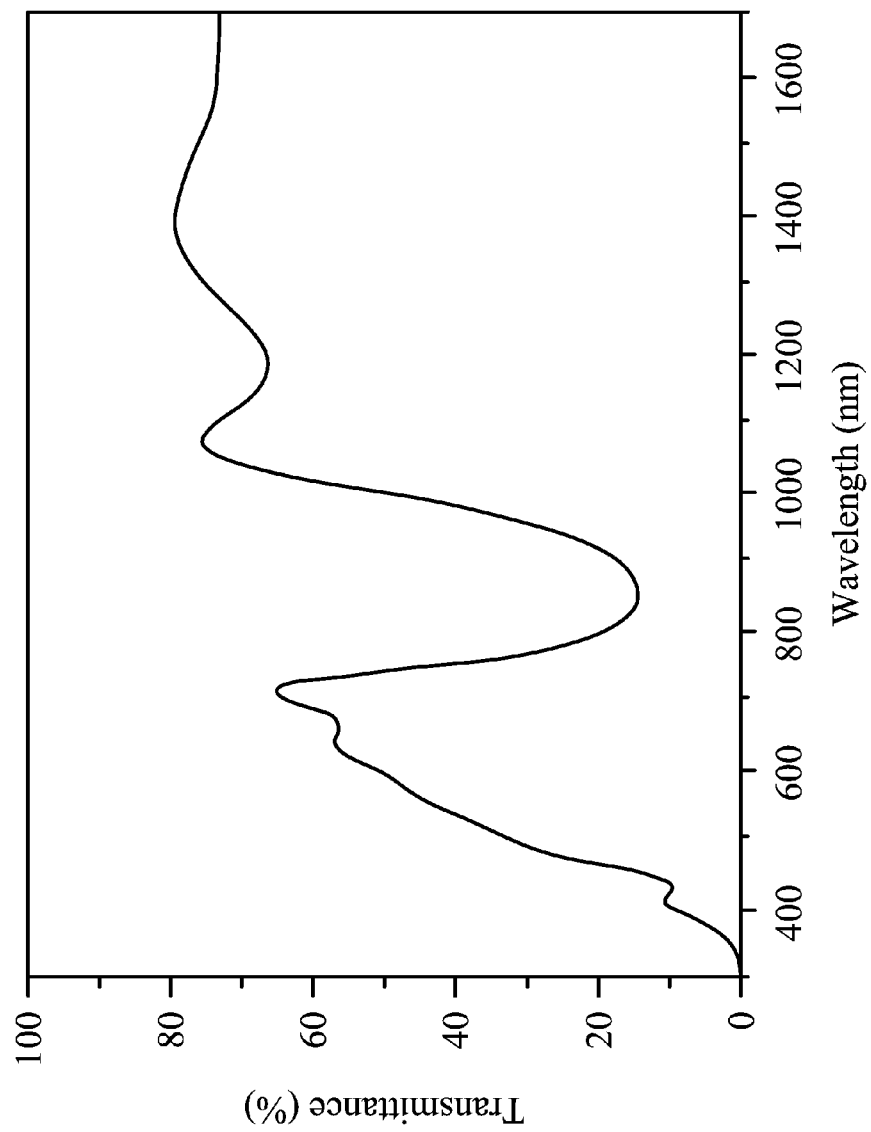
FIGS. 12a to 12d are simulation results showing a relationship between the wavelength and the reflection of one exemplary embodiment of an oxide distributed Bragg reflector (DBR) film of the invention with various thicknesses, wherein the DBR film has three pairs of oxide films.
Figure 12B:
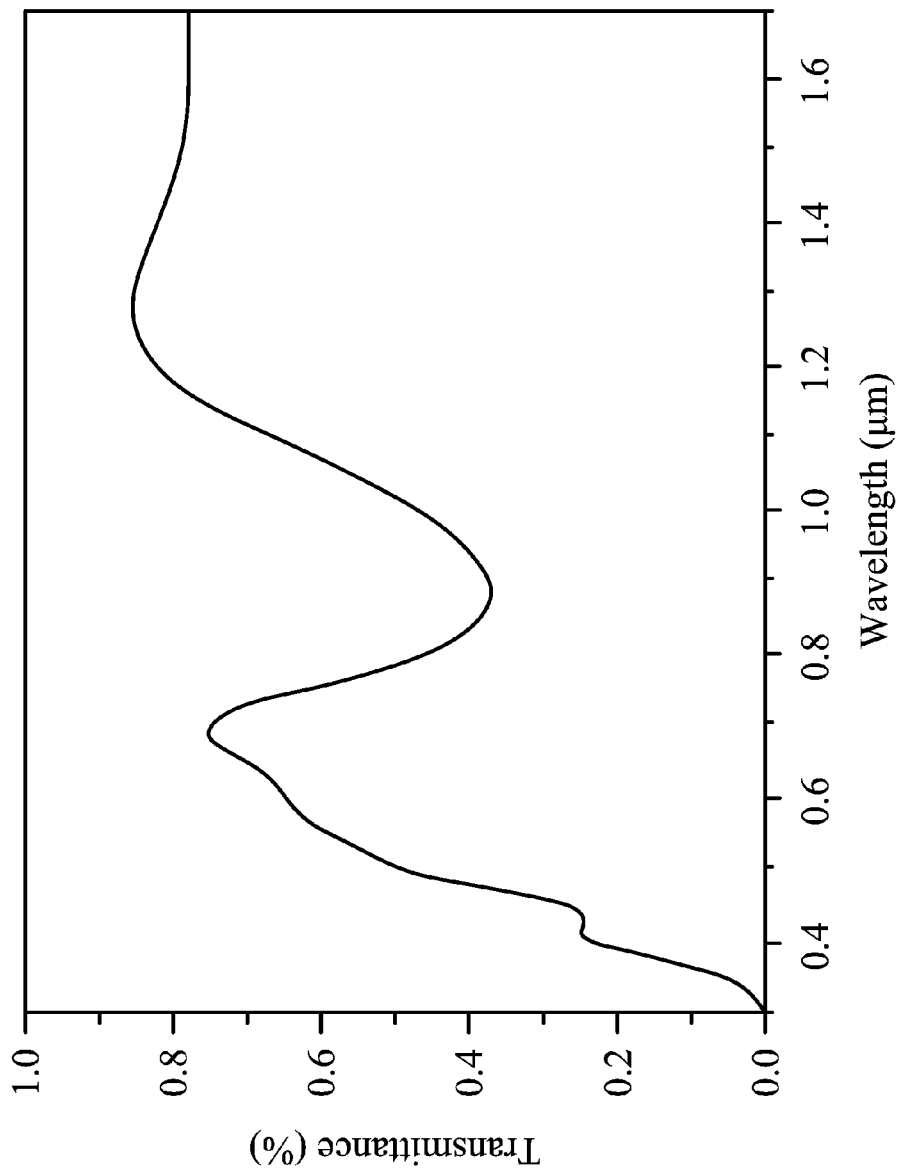
Figure 12C:
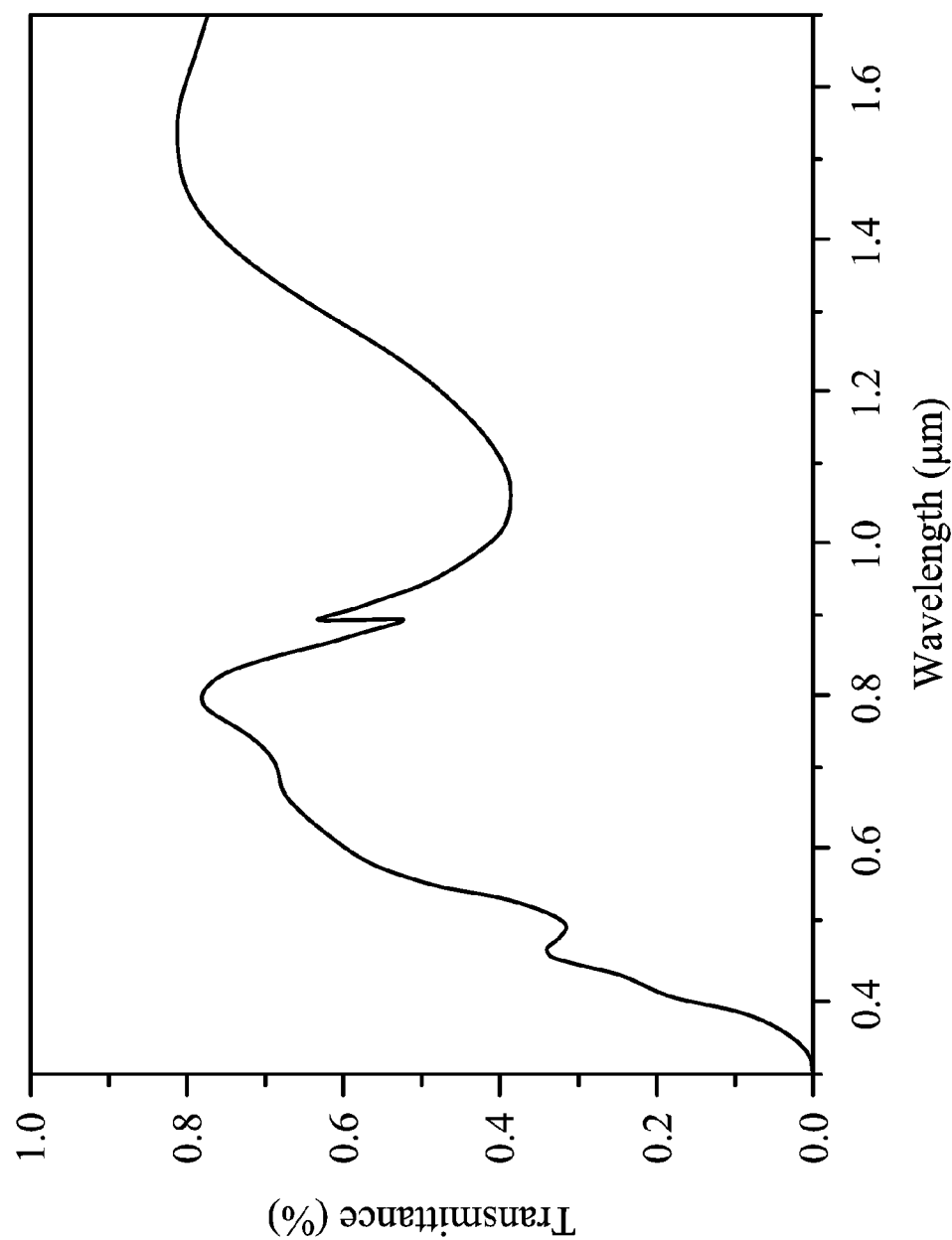
Figure 12D:
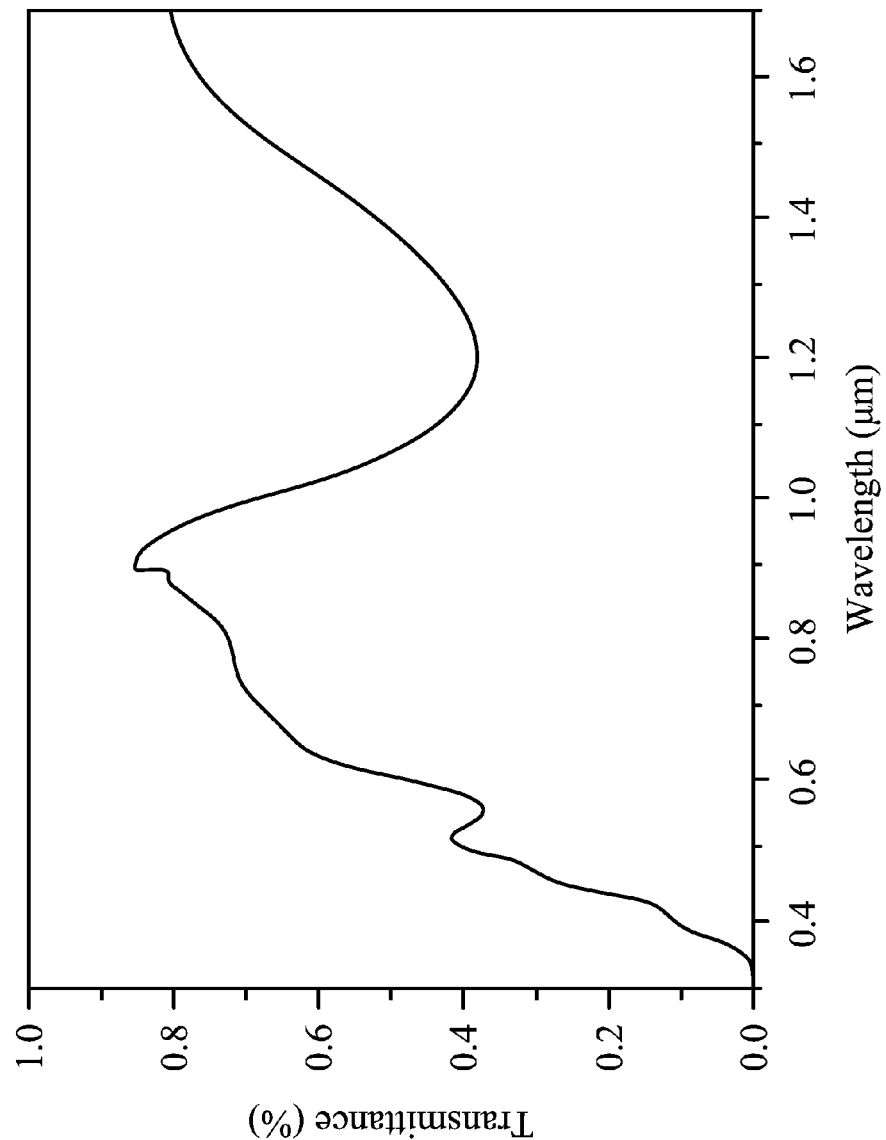

The structure and characteristics of a distributed Bragg reflector (DBR) are specifically described in the following. FIG. 10 is a schematic view of a distributed Bragg reflector (DBR) 810. Generally speaking, the DBR is fabricated by alternatively laminating a high reflective index material 806 and a low reflective index material 804 in pairs 808, wherein the high reflective index material 806 and the low reflective index material 804 both have a thickness of one quarter of a specific wavelength λ. As shown in FIG. 10, each pair 808 serves as one period of the DBR 810. Therefore, a total reflectivity of the DBR 810 is defined according to the number of pairs 808, a difference between the high reflective index material 806 and the low reflective index material 804 and boundary conditions. Consequently, a constructive interference for an incident light reflected from the DBR 810 occurs by tuning differences of thicknesses and the reflective indexes between the high reflective index material 806 and the low reflective index material 804. Each of the pairs 208 of oxide films in the oxide distributed Bragg reflector (DBR) film 210 as shown in FIG. 6 choices the $TiO_2$ film 204 as a lower low reflective index material and $SiO_2$ film 206 as an upper high reflective index material, wherein the refractive index (n) of the upper $SiO_2$ film 206 is between about 1.4 and 1.5, and the refractive index (n) of the lower $TiO_2$ film 204 is between about 1.9 and 2.7. FIGS. 11a and 11b are measurement results of a reflective index (n) and an extinction coefficient (k) of a $SiO_2$ film 206 of one exemplary embodiment of an oxide distributed Bragg reflector film 210. FIGS. 11c and 11d are measurement results showing the reflective index (n) and the extinction coefficient (k) of a $TiO_2$ film 204 of one exemplary embodiment of an oxide distributed Bragg reflector film 210. From the measurement results of FIGS. 11a to 11d, the $SiO_2$ film 206 of the oxide distributed Bragg reflector (DBR) film 210 has a reflective index (n) of about 1.46, and the $TiO_2$ film 204 has a reflective index (n) of about 2.11. Therefore, the reflective index (n) of the $TiO_2$ film 204 significantly affect the reflection result of the oxide distributed Bragg reflector (DBR) film 210.

FIGS. 12a to 12d are simulation results showing a relationship between the wavelength and the reflection of one exemplary embodiment of an oxide distributed Bragg reflector (DBR) film 210 of the invention with various thicknesses, wherein the DBR film 210 has three pairs of oxide films. Thicknesses of the TiO$_2$ film 204 and the SiO$_2$ film 206 of the pairs of oxide films shown in FIGS. 12a to 12d are 125 nm, 130 nm, 150 nm and 170 nm, respectively. From the simulation results shown in FIGS. 12a to 12d, the DBR film 210 with the 125 nm oxide films may effectively reflect light of wavelengths between about 750 nm and 1000 nm, the DBR film 210 with the 130 nm oxide films may effectively reflect light of wavelengths between about 800 nm and 1100 nm, the DBR film 210 with the 150 nm oxide films may effectively reflect light of wavelengths between about 950 nm and 1200 nm, and the DBR film 210 with the 170 nm oxide films may effectively reflect light of wavelengths between about 1050 nm and 1400 nm.

In one embodiment, the multilayered infrared light reflective structure 500b may further comprise an oxide isolated layer 212 disposed on the DBR film 210 as shown in FIG. 6, wherein the oxide isolated layer 212 may comprise a tungsten oxide (WO$_{3-x}$) layer, and the oxide isolated layer 212 may have a thickness of between about 2000 nm and 3000 nm. The oxide isolated layer 212 may be used to reflect light of the infrared light wavelength region (for example, the WO$_{3-x}$ layer may reflect light of wavelengths between about 800 nm and 1450 nm) which can not be reflected by the doped oxide film 202 and the DBR film 210, so that infrared light reflection is improved for the multilayered infrared light reflective structure 500b.

Figure 7:
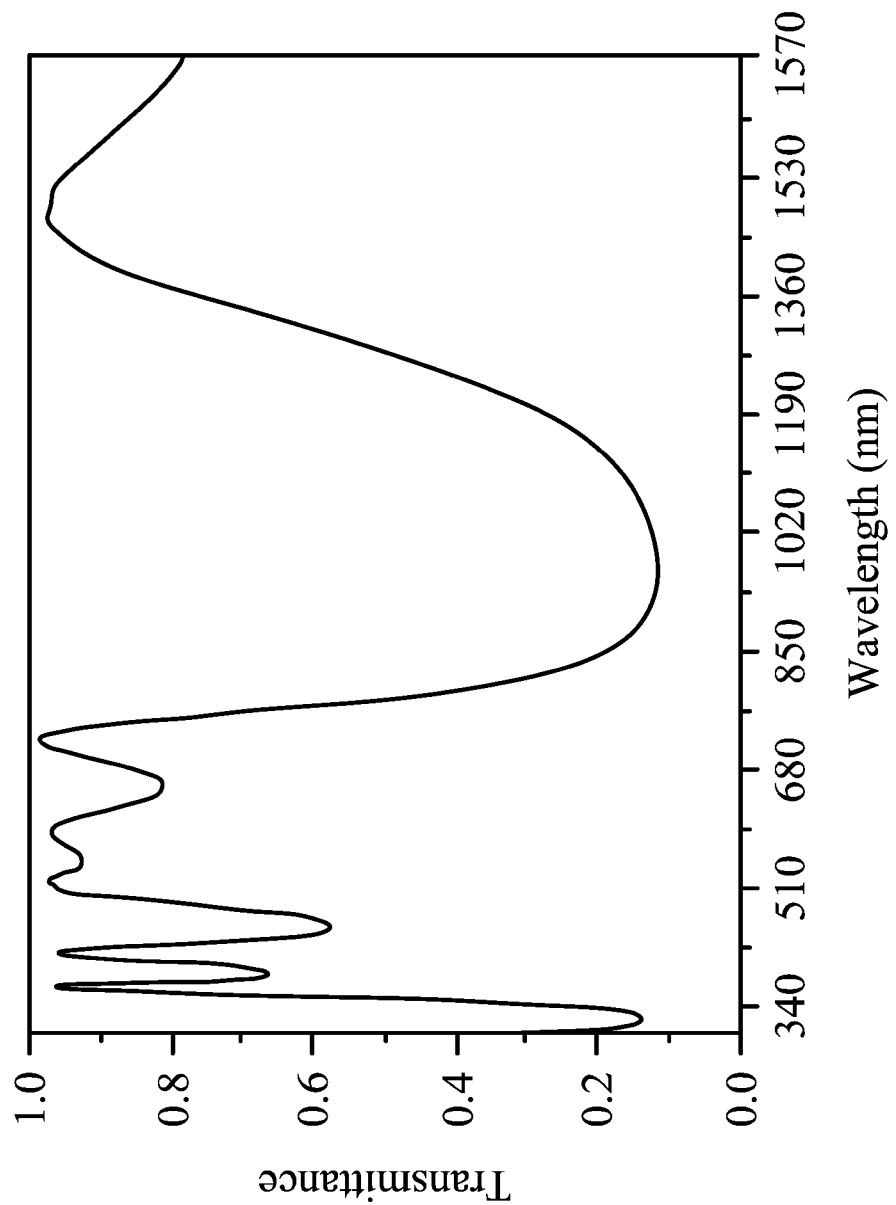
FIG. 7 is a simulation result showing a relationship between the wavelength and the transmittance of another exemplary embodiment of an oxide distributed Bragg reflector (DBR) film of a multilayered infrared light reflective structure of the invention.

FIG. 7 is a simulation result showing a relationship between the wavelength and the transmittance of another exemplary embodiment of an oxide distributed Bragg reflector (DBR) film 210 of a multilayered infrared light reflective structure 500b of the invention. Due to the DBR being a type of one-dimensional photonic crystal, the DBR is a structure composed by laminating at least one pair of dielectric materials, which have different reflective indexes and thicknesses of one quarter of a specific wavelength. Also, a structural design of the DBR results in preventing light of a specific wavelength region to be transmitted therein, wherein the specific wavelength may be referred to as a photonic band gap. Thus, by controlling the reflective indexes and the thickness of the films in the DBR film, the reflection wavelength region and efficiency are well controlled. As shown in FIG. 7, when the DBR film 210 is constructed by three pairs 208 of the oxide films laminated vertically and continuously, and the thicknesses of the TiO$_2$ film 204 (n=2.5) and the SiO$_2$ film 206 (n=1.5) both are about 150 nm, the DBR film 210 may effectively reflect light of wavelengths between about 800 nm and 1100 nm, wherein the transmittance of the light in wavelengths between about 800 nm and 1100 nm is lower than 0.3, so that the DBR film 210 can reflect up to about 70% of infrared light.

Figure 8:
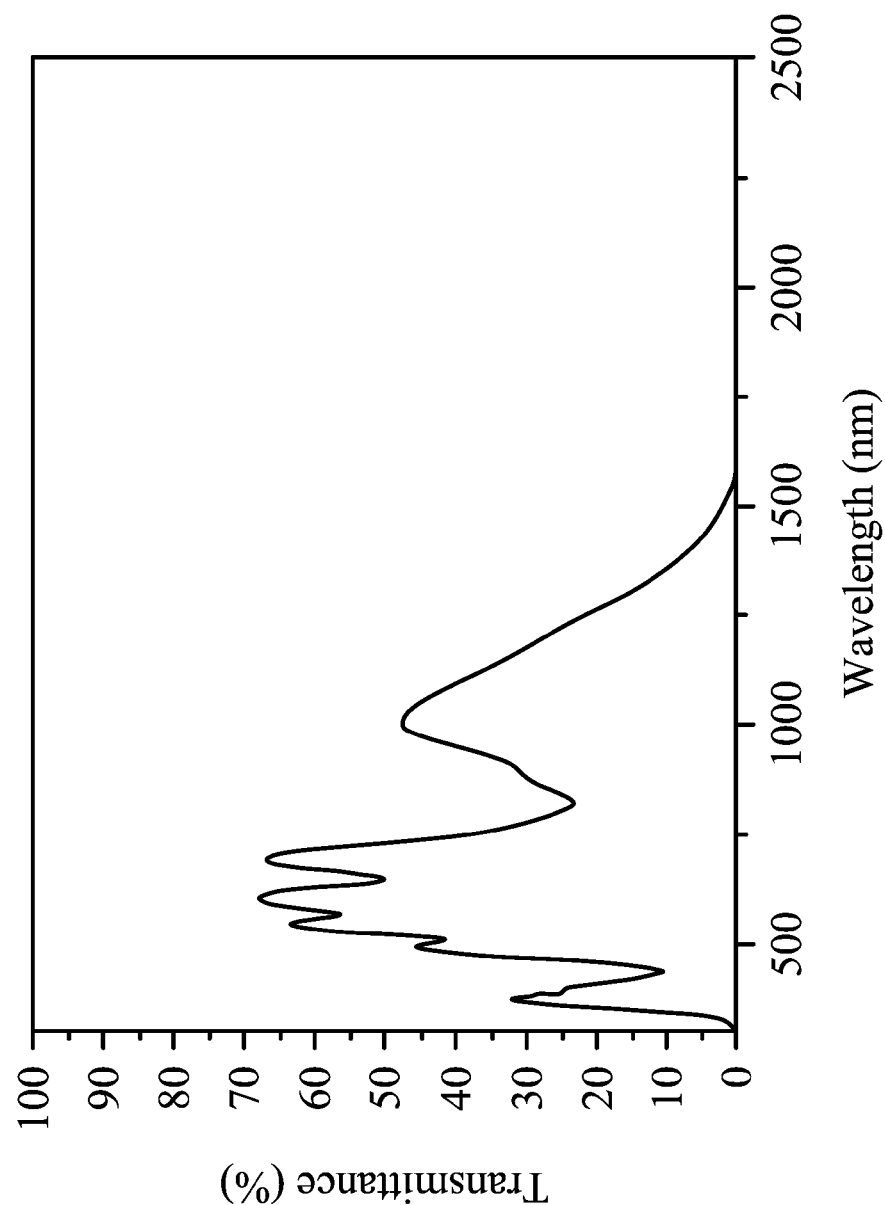
FIG. 8 illustrates a relationship between the wavelength and the transmittance of another exemplary embodiment of a multilayered infrared light reflective structure of the invention.
Figure 9:
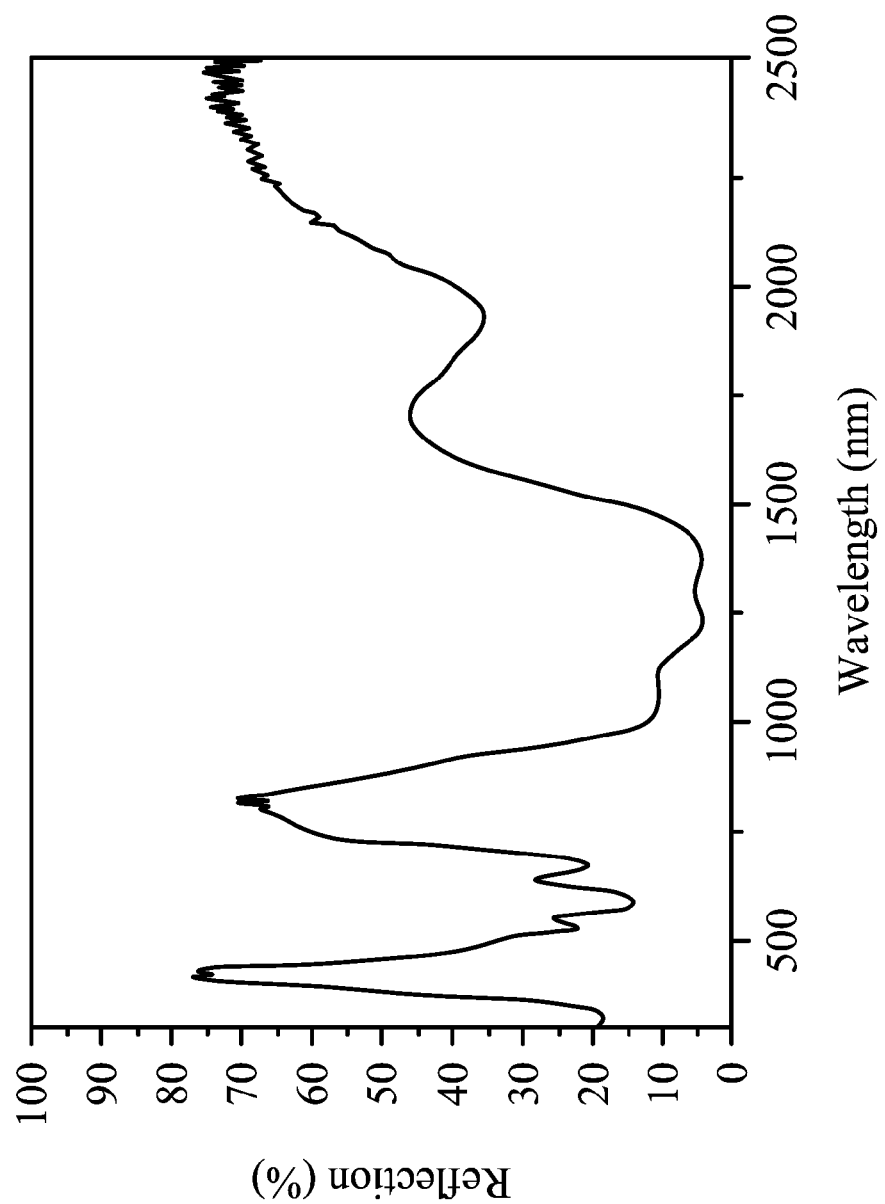
FIG. 9 illustrates a relationship between the wavelength and the reflection of another exemplary embodiment of a multilayered infrared light reflective structure of the invention.

FIG. 8 illustrates a relationship between the wavelength and the transmittance (%) of another exemplary embodiment of a multilayered infrared light reflective structure 500b of the invention as shown in FIG. 6. FIG. 9 illustrates a relationship between the wavelength and the reflection (%) of another exemplary embodiment of a multilayered infrared light reflective structure 500b of the invention as shown in FIG. 6. Another exemplary embodiment of a multilayered infrared light reflective structure 500b used in FIGS. 8 and 9 is fabricated by the following processes. In one embodiment, the doped oxide film 202 may be deposited on the transparent substrate 200 by a chemical spraying or atmospheric chemosynthesis method. In one embodiment, when the doped oxide film 202 is formed by the chemical spraying method, an atomizer with a resonance frequency between about 1.5 KHz and 2.6 MHz or a precision spray nozzle with a diameter of about 10 nm may produce droplets of a mixed gas of, for example, a carrier gas comprising air, oxygen, nitrogen and a reactive gas comprising Sn(OH)$_4$, NH$_4$F, LiF or Li(OH), with a diameter between about 5 μm and 80 μm on the heated transparent substrate 200 by using under a temperature of between about 360° C. and 460° C., to form the doped oxide film 202. In one embodiment, the doped oxide film 202 may comprise a doped tin oxide film, for example, a lithium and fluorine co-doped tin oxide (Li—F:SnO$_2$) film, an aluminum-doped zinc oxide (Al:ZnO$_2$) film, a tin-doped indium oxide (Sn:In$_2$O$_3$) film or a gallium-doped zinc oxide (Ga:ZnO$_2$) film. In one embodiment, the doped oxide film 202 is a Li—F:SnO$_2$ film, a dopant concentration of lithium (Li) in the Li—F:SnO$_2$ film is between about 0.3 at % and 4.2 at %, and a dopant concentration of fluorine (F) in the Li—F:SnO$_2$ film is between about 0.1 at % and 2.5 at %. The doped oxide film 202 is used as a first infrared light reflective film 202, wherein the doped oxide film 202 reflecting light in wavelengths between about 1500 nm and 2500 nm may have a thickness which is smaller than about 2 μm. Next, the oxide distributed Bragg reflector (DBR) film 210 is laminated on the doped oxide film 202, wherein the DBR film 210 may be formed using a chemical sol-gel chemosynthesis method to prepare a SiO$_2$ aqua solution and a TiO$_2$ aqua solution. When performing the chemical sol-gel chemosynthesis method, HCl is used to control the pH value of the SiO$_2$ aqua solution, thereby affecting a hydrolysis rate of the SiO$_2$ aqua solution. Also, a proper surfactant may be added to extend a gel time to avoid agglomeration of SiO$_2$. Moreover, a reaction temperature of TiO$_2$ and an amount of additional water are controlled to control the hydrolysis rate the TiO$_2$ aqua solution, so that a dissolution rate and the amount of nuclei separated out of the solution are also controlled. Thus, the diameter of nuclei is accurately controlled. Finally, a spin coater used to fabricate the DBR film structure comprises the steps as follows. (1) coating a SiO$_2$ film on a clean glass substrate, wherein a thickness of the SiO$_2$ film is controlled to be between about 100 nm and 170 nm and an unnecessary solvent of the SiO$_2$ aqua solution is removed at a temperature of about 300° C. to form a dense SiO$_2$ film. (2) Next, a TiO$_2$ film is coated on the dense SiO$_2$ film, and a thickness of the TiO$_2$ film is controlled to be between about 100 nm and 170 nm and an unnecessary solvent of the TiO$_2$ aqua solution is removed at a temperature of about 300° C. to form a dense TiO$_2$ film. (3) Next, steps (1) and (2) are repeated to form the DBR film. Finally, the DBR film is baked for 5 hours at a temperature of about 500° C. by a baking process, so that the amorphous TiO$_2$ may transform into a crystalline TiO$_2$. The baking process improves the reflection of the DBR film. Note that the description of another exemplary embodiment of a multilayered infrared light reflective structure 500b of the invention is completed. In this embodiment, the doped oxide film 202 of the multilayered infrared light reflective structure 500b is a Li—F:SnO$_2$ film with a thickness of about 2300 nm. Also, the DBR film 210 of the multilayered infrared light reflective structure 500b is constructed by three pairs 208 of the oxide films (six layers in total) laminated vertically and continuously, and the thicknesses of the TiO$_2$ film 204 (n=2.5) and the SiO$_2$ film 206 (n=1.5) both are between about 100 nm and 170 nm. Further, the oxide isolated layer 212 of the multilayered infrared light reflective structure 500b is a tungsten oxide (WO$_{3-x}$) layer with a thickness of about 3000 nm. The total number of films of the multilayered infrared light reflective structure 500b is eight. As shown in FIGS. 8 and 9, infrared light reflection effect of the multilayered infrared light reflective structure 500b is contributed by two types of films, which are the doped oxide film 202 and the DBR film 210, without interference from each other. Also, the infrared light reflection effect of the three pairs 208 of the DBR film 210 for light with wavelengths between about 800 nm and 1000 nm can be up to about 70%. Further, the doped oxide film 202 may reflect the infrared light of wavelengths between about 1500 nm and 10 μm. Moreover, the $WO_{3-x}$ oxide isolated layer 212 may reflect light of wavelengths between about 800 nm and 1450 nm. Therefore, the multilayered infrared light reflective structure 500b may effectively reflect infrared light. As shown in FIG. 8, transmittance for visible light of another exemplary embodiment of a multilayered infrared light reflective structure 500b is larger than 60%.

In summary, the multilayered infrared light reflective structure 500b has transmittance for visible light (wavelength between about 400 nm and 700 nm) of larger than about 60%, and reflects most of the near infrared light. The multilayered infrared light reflective structure 500b utilizes a concept of a combined structure by using a heavily doped oxide film with high infrared light reflection efficiency as a first infrared light reflection layer. Also, an oxide DBR film disposed on the heavily doped oxide film may serve as a second infrared light reflection layer, thereby allowing incident light to be incident from a top surface of the oxide DBR film into the multilayered infrared light reflective structure. The oxide DBR film may be used to enhance reflection of infrared light. Therefore, the infrared light reflection efficiency of the multilayered infrared light reflective structure can be significantly improved. The total number of films of the multilayered infrared light reflective structure 500b can be controlled to be less than six due to the combined structure, and the total thickness of the multilayered infrared light reflective structure 500b can be reduced to less than the conventional multilayered infrared light reflective structure. Additionally, the multilayered infrared light reflective structure 500b fabricated by a wet chemical deposition method simplifies fabrication processes and saves fabrication costs. Therefore, the multilayered infrared light reflective structure 500b may be applied to energy saving glass building materials, serving as an energy saving material structure for next generation products.

Exemplary embodiments of a multilayered infrared light reflective structure are provided. One exemplary embodiment of a multilayered infrared light reflective structure 500a allows an incident light to be incident from a top surface of a transparent substrate into the heavily doped oxide film in the multilayered infrared light reflective structure. High reflection efficiency can be achieved due to a high dopant concentration of the heavily doped oxide film. Additionally, another exemplary embodiment of a multilayered infrared light reflective structure 500b utilizes a heavily doped oxide film as a first infrared light reflection layer. Further, another exemplary embodiment of a multilayered infrared light reflective structure 500b utilizes a distributed Bragg reflector (DBR) film formed by a $SiO_2/TiO_2$ reflective laminating film as a second infrared light reflection layer. The multilayered infrared light reflective structure 500b combines the characteristics of the first and the second infrared light reflection layers, thereby effectively reflecting infrared light of wavelengths between about 800 nm and 10 μm. Also, transmittance for visible light (wavelength between about 400 nm and 700 nm) of the multilayered infrared light reflective structures 500a and 500b are larger than about 60%. Therefore, exemplary embodiments of the multilayered infrared light reflective structure 500a and 500b can substantially improve the utilization of energy saving glass building materials.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multilayered infrared light reflective structure, comprising:
    a transparent substrate;
    a doped oxide film disposed on the transparent substrate, wherein the doped oxide film comprises a lithium and fluorine co-doped tin oxide (Li—F:$SnO_2$) film or a gallium-doped zinc oxide (Ga:$ZnO_2$) film;
    an oxide isolated layer disposed on the doped oxide film, thereby allowing incident light to be incident from a top surface of the transparent substrate into the multilayered infrared light reflective structure, wherein the oxide isolated layer comprises a tungsten oxide ($WO_{3-x}$) layer;
    an oxide distributed Bragg reflector film sandwiched between the doped oxide film and the oxide isolated layer, wherein the oxide distributed Bragg reflector film is formed by laminating a plurality of pairs of oxide films, and wherein each of the pairs of oxide films comprises a lower $TiO_2$ film and an upper $SiO_2$ film.

2. The multilayered infrared light reflective structure as claimed in claim 1, wherein the doped oxide film has a thickness which is smaller than 2 μm.

3. The multilayered infrared light reflective structure as claimed in claim 1, wherein the oxide distributed Bragg reflector film comprises two to ten pairs of oxide films.

4. The multilayered infrared light reflective structure as claimed in claim 1, wherein the $TiO_2$ film has a thickness of between 50 nm and 250 nm.

5. The multilayered infrared light reflective structure as claimed in claim 1, wherein the $SiO_2$ film has a thickness of between 50 nm and 250 nm.

6. The multilayered infrared light reflective structure as claimed in claim 1, wherein the oxide isolated layer has a thickness of between about 100 nm and 5000 nm.

7. The multilayered infrared light reflective structure as claimed in claim 1, wherein the tungsten oxide ($WO_{3-x}$) layer has a thickness of between about 2000 nm and 3000 nm.

* * * * *